(12) United States Patent
Copeland et al.

(10) Patent No.: US 7,503,184 B2
(45) Date of Patent: Mar. 17, 2009

(54) GAS ENGINE DRIVEN HEAT PUMP SYSTEM WITH INTEGRATED HEAT RECOVERY AND ENERGY SAVING SUBSYSTEMS

(75) Inventors: Larry Copeland, Las Vegas, NV (US); Robert Gaylord, Las Vegas, NV (US); Mark Haught, Las Vegas, NV (US); Isaac Mahderekal, Las Vegas, NV (US); Dudley J. Sondeno, Las Vegas, NV (US); Tommis E. Young, Las Vegas, NV (US)

(73) Assignee: Southwest Gas Corporation, Las Vegas, NV (US)

( * ) Notice: Subject to any disclaimer, the term of this patent is extended or adjusted under 35 U.S.C. 154(b) by 232 days.

(21) Appl. No.: 11/464,060

(22) Filed: Aug. 11, 2006

(65) Prior Publication Data

US 2008/0034777 A1    Feb. 14, 2008

(51) Int. Cl.
*F25B 27/02*     (2006.01)
(52) U.S. Cl. ............................... 62/238.7; 237/12.3 B
(58) Field of Classification Search ............... 62/238.7; 237/12.3 B, 12.3 C
See application file for complete search history.

(56) References Cited

U.S. PATENT DOCUMENTS

| | | |
|---|---|---|
| 3,589,437 A | 6/1971 | Shoji et al. |
| 3,698,182 A | 10/1972 | Knoos |
| 3,777,508 A | 12/1973 | Imabayashi et al. |
| 4,112,705 A | 9/1978 | Sisk et al. |
| 4,311,192 A | 1/1982 | VanderVaart |
| 4,441,901 A | 4/1984 | Endoh |
| 4,561,259 A | 12/1985 | van der Sluys |
| 4,720,638 A | 1/1988 | Vollbrecht |
| 4,771,610 A | 9/1988 | Nakashima et al. |
| 4,936,112 A | 6/1990 | Miller |
| 5,003,788 A | 4/1991 | Fischer |
| 5,054,542 A | 10/1991 | Young et al. |
| 5,099,651 A | 3/1992 | Fischer |
| 5,263,892 A | 11/1993 | Vandervaart |
| 5,315,981 A | 5/1994 | Chen |
| 5,388,420 A | 2/1995 | Yoshida et al. |
| 5,405,253 A | 4/1995 | McLaren |
| 5,429,179 A | 7/1995 | Klausing |
| 5,467,604 A | 11/1995 | Sekigami et al. |
| 5,473,906 A | 12/1995 | Hara et al. |
| 5,473,907 A | 12/1995 | Briggs |
| 5,522,234 A | 6/1996 | Yoo et al. |
| 5,557,939 A | 9/1996 | Mizukami et al. |
| 5,664,421 A | 9/1997 | Matsue et al. |
| 6,354,256 B1 | 3/2002 | Ohanian et al. |
| 6,385,981 B1 | 5/2002 | Vaisman |

(Continued)

*Primary Examiner*—William E Tapolcai
(74) *Attorney, Agent, or Firm*—Greenberg Traurig (57) ABSTRACT

A gas heat pump system powered by natural gas, propane or similar gaseous fuel is disclosed. The system uses heat recovery and heat addition to manage efficient heating and cooling cycles. In a cooling cycle excess heat is vented to the atmosphere while in a heating cycle, excess heat is used to heat a subject structure and to prevent frost from forming on outdoor heat exchangers. A control system monitors the system's operation and corrects abnormal operational conditions or shuts down the system until the system can be manually inspected. The costs of system operation are less than electric systems because of the efficiencies and use of natural gas or propane.

33 Claims, 6 Drawing Sheets

U.S. PATENT DOCUMENTS

| | | |
|---|---|---|
| 6,428,284 B1 | 8/2002 | Vaisman |
| 6,434,937 B2 | 8/2002 | Takamatsu |
| 6,543,427 B2 | 4/2003 | Kawasaki |
| 6,637,218 B2 | 10/2003 | Kasahara |
| 6,638,031 B1 * | 10/2003 | Humburg .................... 417/313 |
| 6,675,601 B2 | 1/2004 | Ebara |
| 6,735,969 B2 | 5/2004 | Kasagi et al. |
| 7,174,727 B2 * | 2/2007 | Kim et al. .................... 62/115 |
| 7,305,840 B2 * | 12/2007 | Kang et al. ................. 62/238.7 |
| 7,305,841 B2 * | 12/2007 | Ryu et al. ................... 62/238.7 |
| 2001/0052238 A1 | 12/2001 | Burk et al. |
| 2002/0050351 A1 | 5/2002 | Yoshimura et al. |
| 2005/0262865 A1 | 12/2005 | Yabutani |
| 2006/0037343 A1 * | 2/2006 | Kang et al. ................. 62/323.1 |
| 2006/0037352 A1 * | 2/2006 | Cho et al. .................. 62/323.3 |
| 2006/0144067 A1 * | 7/2006 | Choi et al. ................. 62/238.7 |

* cited by examiner

FIG.1

FIG. 2A COOLING FLOWS w/o HWXGR

FIG. 2B
COOLING FLOWS
with HWXGR

FIG. 3A
HEATING WITH AMB. CONDITIONS ABOVE FROST POINT OF OUTDOOR EXCHANGER

FIG.3C
OPTIONAL COLD CLIMATE HEATER INSTALLED

GAS ENGINE DRIVEN HEAT PUMP SYSTEM WITH INTEGRATED HEAT RECOVERY AND ENERGY SAVING SUBSYSTEMS

FIELD OF THE INVENTION

The embodiments of the present invention relate to refrigerant vapor compression heat pump systems (classic Rankine thermodynamic cycle) driven by combustion engine prime movers with a frostless outdoor heat exchanger, multiple refrigeration circuits, integrated heat recovery, engine cooling and auxiliary heating function configured in single or modular units.

BACKGROUND

Vapor compression heat pump systems are widely used to provide heating and cooling air conditioning to residential and, to a lesser extent, commercial facilities. One drawback of the vapor compression heat pump systems is that the heating capacity decreases as the ambient temperature decreases. Thus, during winter months the vapor compression heat pump systems lack efficiency. Moreover, with low ambient temperatures, building heat losses increase such that building temperatures decrease. One well-known solution to the inefficiency problem has been the addition of auxiliary electric heat strips. Unfortunately, the heat strips increase power usage and therefore system cost.

In recent years, combination air conditioner/heat pump systems have been suggested as a solution to the inefficiencies discussed above. A gas engine driven air conditioner/heat pump system utilizes a natural gas engine, instead of a traditional electric motor, to drive a compressor in the refrigerant circuit. An air conditioner/heat pump system utilizing a natural gas engine is known as a gas heat pump type air conditioner ("GHP"). The GHP uses natural gas, which is less expensive compared to other fuels such that the operating cost of the GHP is less than air conditioner/heat pump system driven by a conventional electric motor ("EHP").

One advantage of using a combustion type engine, in lieu of an electric motor, in a heat pump system is the ability to use excess heat of combustion generated by the engine. The excess heat is available for wintertime heat augmentation thereby reducing or eliminating the need for auxiliary heaters. It has been a common practice with combustion engine heat pump systems to recover the excess heat from the engine by conveying a working fluid (e.g., water and ethylene glycol antifreeze) through the cooling and sometimes the exhaust system such that waste heat from the engine is absorbed by the working fluid. The heated working fluid is then pumped to a heat exchanger or radiator located in the air flow leading to the air-conditioned space.

Another advantage of using a combustion engine is the significant reduction is costs associated with the use of inexpensive fuel sources such as natural gas, propane and similar gaseous fuels.

While the advantages of using waste heat from a combustion engine are well recognized, the wide range of options for recovering and using the waste heat has required numerous, separate components to facilitate the heat exchange, auxiliary heating, defrosting and heat rejection. The complexity, size and cost of the heat pump systems having desirable heat recovery and use capability have increased accordingly. In addition, the use of small internal combustion engines at high ambient temperatures and at increased altitudes is problematic in that the environmental conditions reduce output horsepower.

Therefore, the need exists for a heat pump system which recovers and applies wasted heat effectively into the air-conditioned space and minimizes the use of electrical power demand and costs during both the heating and cooling heat pump cycles in high temperature environments.

SUMMARY

Accordingly, one embodiment of the present invention is a gas heat pump system having an engine compressor section, indoor section and outdoor section comprising: one or more refrigeration circuits comprising a refrigeration compressor and switching device, said switching device operable to direct refrigerant into the indoor section during a heating cycle and into the outdoor section during a cooling cycle; said engine compressor section comprising: an engine capable of running on a gaseous fuel; an engine cooling system; a fuel intake system; and an exhaust gas system; said indoor section comprising: an indoor heat exchanger; one or more fans operable to pass indoor air across the indoor heat exchanger; and one or more expansion valves corresponding to the indoor heat exchanger; said outdoor section comprising: a radiator; one or more outdoor heat exchangers; one or more fans operable to pass outdoor air across the radiator and the outdoor heat exchangers; and one or more expansion valves corresponding to each outdoor heat exchanger.

The embodiments of the present invention satisfy the need providing a system that integrates waste heat recovery, maximizes load efficiency, maintains comfortable indoor air supply temperatures during low ambient outside temperatures while minimizing electricity demand and cost during a heating and cooling cycle.

The GHP system disclosed herein comprises three primary components: an engine compressor section, an indoor section and an outdoor section. Ideally, the primary components are contained within a single unit.

In one embodiment of the present invention, the engine compressor section comprises an internal natural gas engine, waste heat recovery components and multiple belt driven scroll type compressors. In this embodiment, engine coolant is pumped through the waste heat recovery components and the engine thereby removing and recovering the waste heat.

In one embodiment, the indoor, section comprises an indoor heat exchanger containing multiple interlaced refrigerant circuits and an auxiliary heat circuit and an air blower driven by a multi-speed motor. Also contained within the indoor section are thermostatic expansion devices, check and control valves and miscellaneous refrigeration and electrical components.

In one embodiment, the outdoor section comprises dual outdoor heat exchangers with one heat exchanger dedicated to a separate refrigerant circuit and anti-frost circuit and multiple high efficiency fans driven by high efficiency multi-speed motors. Also contained within the outdoor section are an engine coolant radiator and various valves and controls.

A refrigeration system of one embodiment of the present invention comprises two complete heat pump circuits driven by a single natural gas internal combustion engine. The refrigeration system is designed and controlled such that system efficiency is maximized by varying the number of running compressors and refrigerant flow rate through the circuits to satisfy the heating and cooling load requirement for the subject air-conditioned space. The refrigerant flow rate is adjusted by varying the speed of the natural gas internal combustion engine. Load efficiency is maximized by interlacing refrigerant circuits within the indoor heat exchanger and by varying the airflow across the indoor and outdoor heat exchangers to match the ambient conditions and load requirements.

By providing cooling of the internal combustion engine's combustion air and additional surface area on the outdoor heat exchanger, the refrigeration system becomes ideal for high desert environments.

When the GHP is operated in a cooling mode, waste heat is removed from the engine and exhaust by coolant which is directed to the radiator where the waste heat is either rejected to the atmosphere or further directed to an auxiliary heating device like a hot water heating system, swimming pool heating system or other domestic water systems requiring heat.

When the GHP is operated in a heating a mode, waste heat is removed from the engine and exhaust by the coolant which is directed to the indoor and outdoor heat exchangers. Unless the outdoor ambient temperature is below a threshold frost point temperature (e.g., freezing), all the coolant is directed to the auxiliary heat circuit in the outdoor heat exchanger thereby causing all recoverable heat to be transferred from the engine into the subject air-conditioned space. Such an embodiment maximizes the coefficient of performance (COP), where COP is defined as the ratio of the useful heating energy output to the total energy input (fuel and electricity consumed). If the ambient temperature is below the threshold frost point temperature, part or all of the engine coolant is directed to the anti-frost circuit in the outdoor heat exchanger. The COP is once again increased based on the higher inlet air temperature to the refrigerant portion of the outdoor heat exchanger.

The embodiments of the present invention also incorporate the capability to add additional heat to the system via an auxiliary natural gas heater (AXTHR) to reduce engine warm up time and provide, in colder climates, additional heat to the subject air-conditioned space without the need for auxiliary electric strips.

Other variations, embodiments and features of the present invention will become evident from the following detailed description, drawings and claims.

DETAILED DESCRIPTION

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Figure 1:
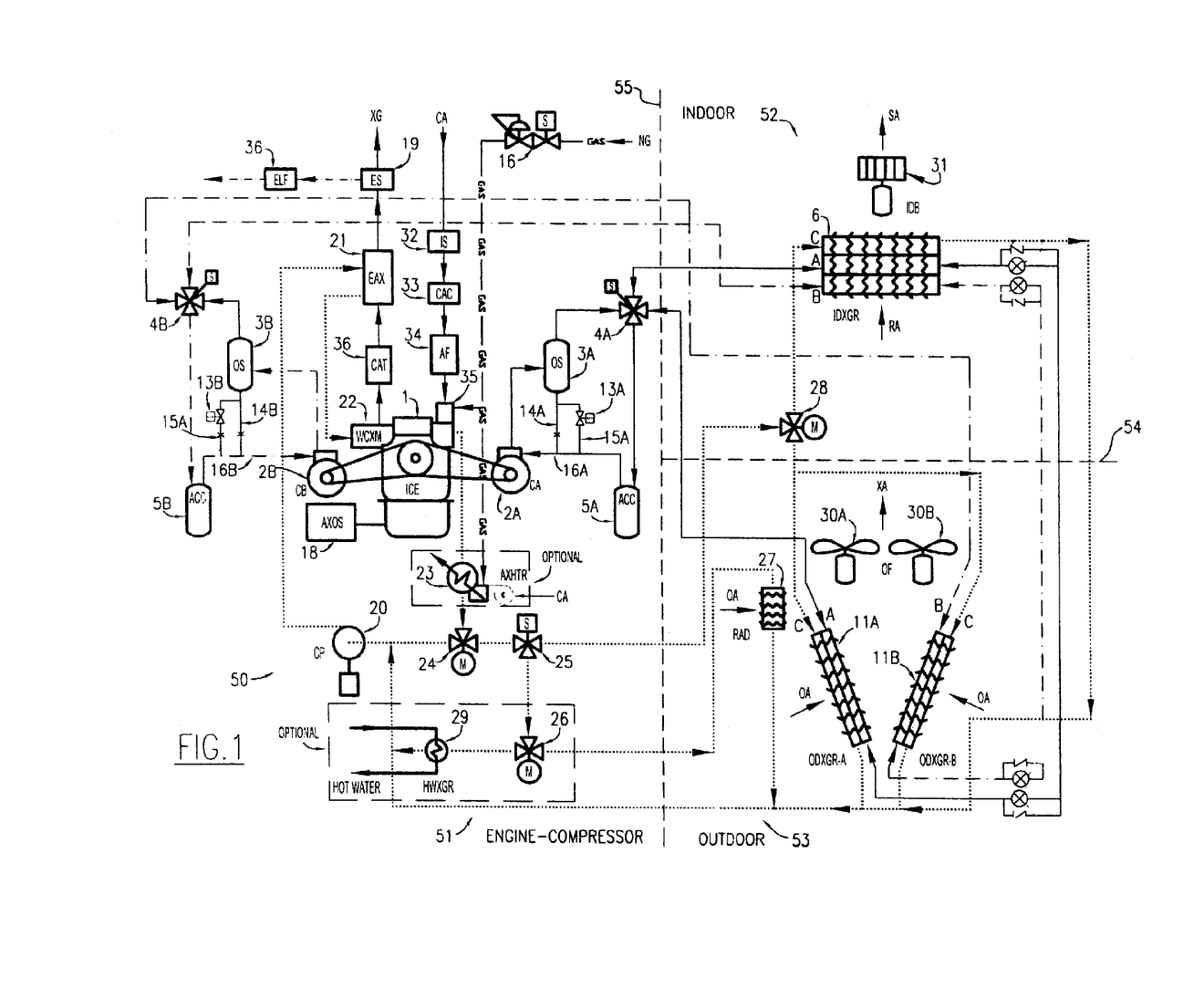
FIG. 1 illustrates a schematic diagram of a first embodiment of a gas engine driven heat pump system of the present invention.

Reference is now made to the figures wherein like parts are referred to by like numerals throughout. FIG. 1 shows a schematic diagram of a gas engine driven heat pump system of the present invention generally referred to by reference numeral 50. The system 50 includes an engine compressor section 51, an indoor section 52 and an outdoor section 53 divided by lines 54, 55.

The system 50 comprises two identical refrigeration circuits referred to as circuit A and circuit B. Internal combustion engine 1 runs on natural gas (or propane or other suitable gases) and drives two refrigeration compressors 2A, 2B. The refrigeration circuits operate using classic Rankin cycle principals. A Rankine cycle is a thermodynamic cycle familiar to those skilled in the art.

Combustion air (CA) first enters an inlet silencer device 32 that reduces air flow noise. The combustion air then travels through an air cooler device 33 that, depending on the combustion air temperature, may cool the combustion air several degrees. Reducing the combustion air temperature increases the horsepower output of the internal combustion engine 1. The cooled air then passes through an air filter 34 that filters any particulate matter. The clean air then enters an air fuel mixture device 35 located on, or in proximity to, the internal combustion engine 1.

Engine combustion exhaust gases exit the engine 1 through water cooled exhaust manifold 22 where the gases are cooled by engine coolant circulated through the manifold 22. The exhaust gases then enter a catalytic converter 36 that reduces NOx and hydrocarbon emissions. The gases then flow through an exhaust air exchanger 21 such that the gases are cooled to approximately 200° by engine coolant circulated through the exchanger 21. Next, the cooled exhaust gases flow through exhaust separator 19 where any condensed water (a product of combustion) is removed. The remaining exhaust vapors are vented to the atmosphere. The exhaust liquids (e.g., water), which may be acidic, flow to an exhaust liquid filter 36 that neutralizes any acid in the liquid. The neutralized liquid may then be dispensed through a drain.

Natural gas, or propane, from a gas source first enters the system 50 via safety cutoff device and pressure regulator 16. The pressure regulator 16 lowers the gas pressure to a suitable and useable level for receipt by an engine carburetor 35 that causes the gas to be mixed with combustion air. In embodiments utilizing an optional cold climate auxiliary heater 23, natural gas, or propane, is also piped thereto.

An extended engine life and maintenance cycle (e.g., 10,000 hours) may be accomplished by the addition of an auxiliary oil storage tank 18.

Cool low pressure refrigerant vapor is compressed to high pressure by compressors 2A, 2B. Pursuant to the principal defined by the ideal gas law (PV=nRT), as the vapor is compressed, its temperature increases. The now hot, high pressure refrigerant vapor flows to oil separators 3A, 3B which separate oil from the refrigerant. The separated refrigerant oil is returned to compressor suction line 16A, 16B through metering devices 14A, 14B, 15A and 15B and solenoid valves 13A. 13B. Solenoid valves 13A, 13B are activated by a control system in response to changing operating conditions to provide optimum oil flow to the compressors 2A, 2B.

The hot, high pressure refrigerant vapor flows from the oil separators 3A, 3B to reversing or switching valves 4A, 4B, where the vapor is diverted to the indoor exchanger 6 or the outdoor exchangers 11A, 11B, depending on whether the system is in heating or cooling mode.

When the system 50 is in the cooling mode or cycle, the switching valves 4A, 4B divert hot, high pressure refrigerant to the outdoor heat exchangers 11A, 11B, which, in the cooling mode, act as condensers. Refrigerant from valve 4A is directed to outdoor heat exchanger 11A and refrigerant from valve 4B is directed to outdoor heat exchanger 11B. Each outdoor heat exchanger 11A, 11B contains a refrigerant circuit (A, B) and a heating circuit (C). The heating circuit is used during the heating mode to prevent frost accumulation on the outdoor heat exchangers 11A, 11B. The hot, high pressure refrigerant is then condensed to a high pressure liquid and sub-cooled by removing heat from the refrigerant. The heat is removed by drawing cooler outdoor air across the outdoor heat exchangers 11A, 11B. Outdoor fans 30A, 30B provide the air flow and are adjusted by the control system to provide the optimum flow rate to match the required refrigeration load and outdoor ambient conditions.

The high pressure sub-cooled refrigerant liquid then flows through check valve devices 10A, 10B to thermostatic expansion devices 7A, 7B. The thermostatic expansion devices regulate the refrigerant flow which lowers the pressure of the refrigerant as it flows through the device. The pressure reduction causes expansion of the refrigerant liquid whereby a portion flashes into a vapor that, according to the Joule-Thompson effect, causes the temperature of the two phase refrigerant to be reduced.

The cold two-phase refrigerant then enters indoor heat exchanger 6 which functions as an evaporator in the cooling mode. Warm return air from the subject air-conditioned space is drawn across the indoor heat exchanger 6 by indoor blower 31. Heat is removed from the return air thereby cooling the air stream. The cool air stream is then returned to the subject air-conditioned space. The heat removed from the air stream is transferred to the cold two-phase refrigerant flowing through the tubes of the indoor heat exchanger 6 causing the liquid refrigerant to boil. After all liquid refrigerant has boiled into vapor, additional heat is added to the heat exchanger 6 causing the refrigerant vapor to become superheated. The amount of superheat is controlled by the thermostatic expansion devices 7A, 7B.

The indoor heat exchanger 6 includes two interlaced refrigeration circuits (A, B) and one auxiliary heating circuit (C) used during the heating cycle. The interlacing of the refrigerant circuits provides optimum heat exchanger 6 efficiency during full and partial load cycle.

The superheated refrigerant vapor then flows back to the switching valves 4A, 4B and then to suction accumulators 5A, 5B where any liquid refrigerant that may have condensed is separated from the refrigerant vapor. The refrigerant vapor is then drawn into low pressure inlets of the compressors 2A, 2B such that the cycle can be repeated.

During both heating and cooling cycles, engine coolant is circulated through the system 50 by coolant pump 20. Warm coolant is pumped through the exhaust air exchanger 21 where the coolant temperature is raised a few degrees by waste heat recovered from the engine exhaust. The coolant then flows to the water-cooled exhaust manifold 22, located on the internal combustion engine 1, such that the coolant temperature is additionally raised. The coolant then enters the internal combustion engine 1 where it removes heat from the engine 1. This portion of the coolant circuit collects waste heat for efficient use during the heating and cooling cycles.

Figure 2A:
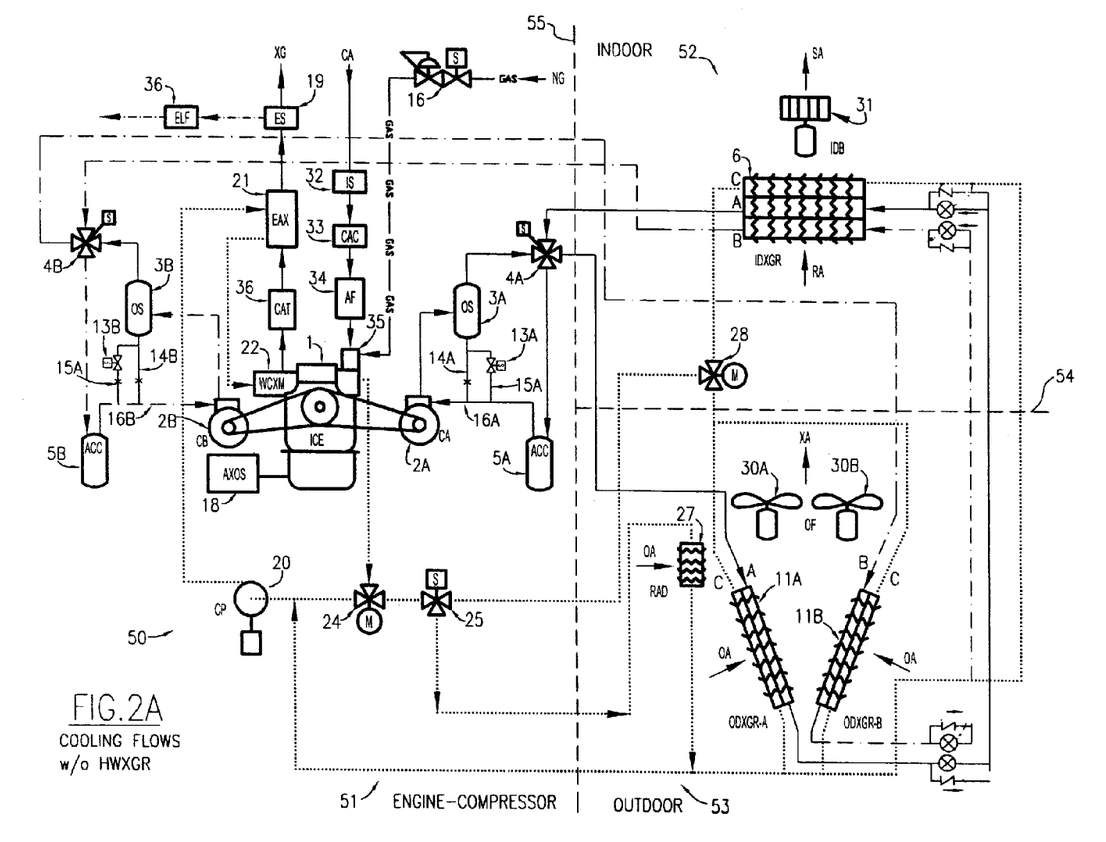
FIG. 2A illustrates a schematic diagram depicting refrigerant and engine coolant flows during a cooling cycle without an optional hot water waste heat exchanger (HWXGR)

Now referring to FIG. 2A, the system 50 is shown operating in a cooling cycle without any optional devices installed. Engine coolant flows from engine 1 to engine temperature control valve 24. A proportional integral derivative (PID) control loop in the control system maintains an efficient engine temperature by directing the coolant flow either back to the engine 1 or to radiator 27. Upon initial startup, in order to bring the engine 1 to a proper operating temperature, the coolant is directed by engine control valve to the engine 1. As the engine temperature approaches the desired operating temperature, the engine temperature control valve 24 directs the coolant to switching valve 25. During the cooling cycle, the switching valve 25 directs the engine coolant to the radiator 27 where excess engine heat is removed. The excess engine heat is removed from the coolant as the result of outside air being drawn across the radiator 27 by outdoor fans 30A, 30B. The coolant then flows to the coolant pump 20 where the coolant cycle begins again.

Figure 2B:
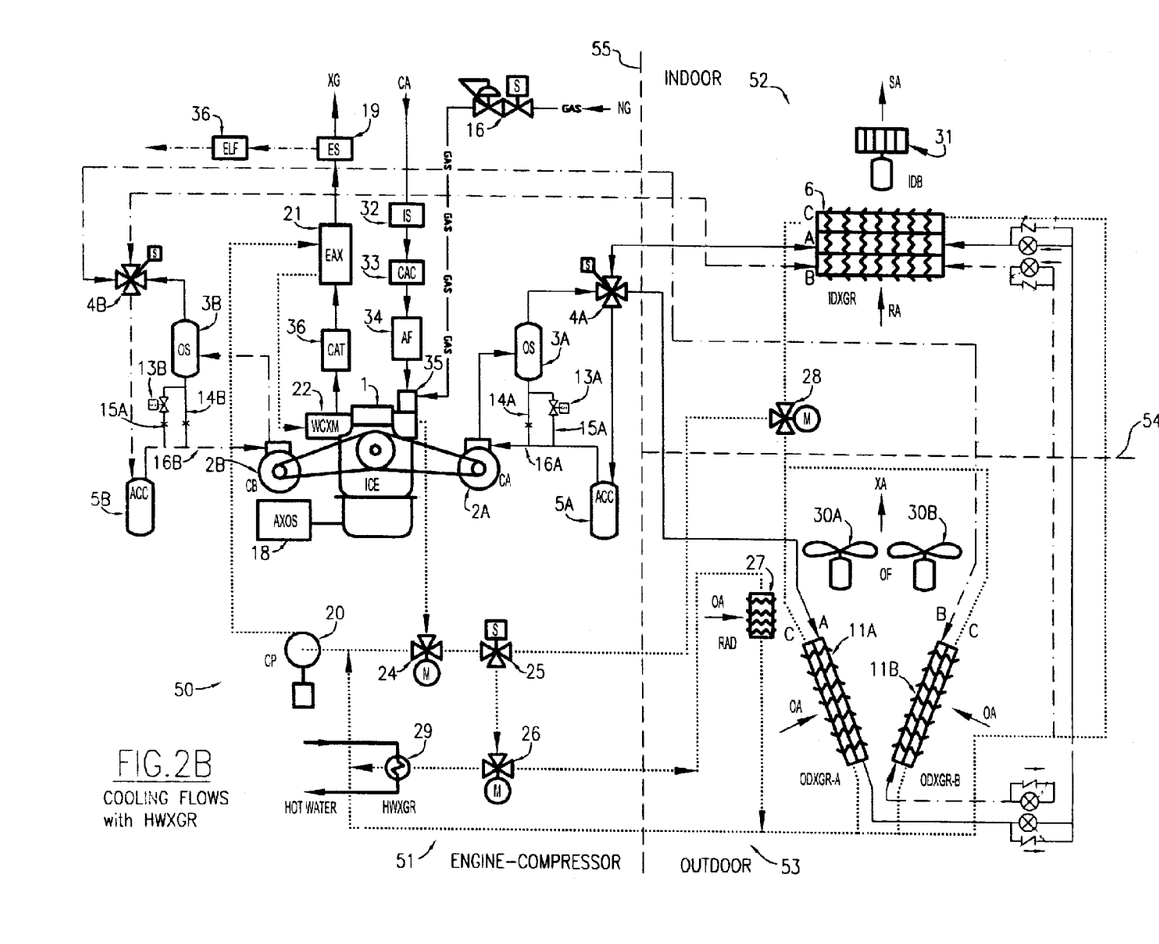
FIG. 2B illustrates a schematic diagram depicting the refrigerant and engine coolant flows during a cooling cycle with the optional hot water waste heat exchanger (HWXGR)

FIGS. 2B shows the system 50 operating in the cooling cycle with an optional hot water exchanger 29 installed. Hot coolant exiting the switching valve 25 flows to a hot water temperature control valve 26. Hot coolant is then directed to the hot water exchanger 29 where waste heat is used to heat domestic water, swimming pools and the like. A PID control loop in the control system regulates the hot coolant flow to the hot water exchanger 29 and the radiator 27. Once a pre-established threshold temperature of the heated water is achieved, the remaining coolant flow is directed to the radiator 27. Coolant exiting the hot water exchanger 29 and radiator 27 flows to the coolant pump 20, where the cycle begins again. In this embodiment, waste heat in efficiently used thereby increasing overall system efficiency.

Figure 3A:
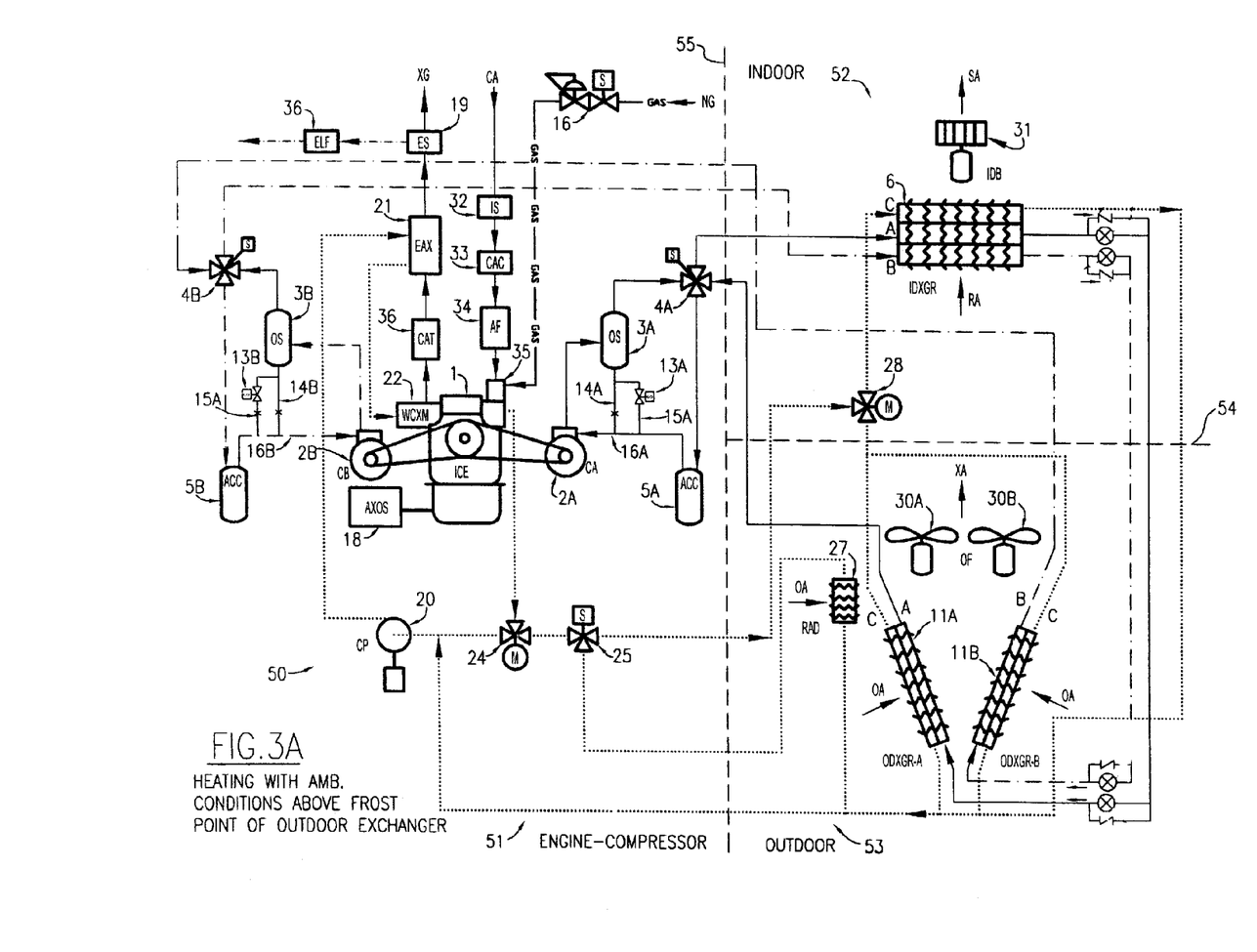
FIG. 3A illustrates a schematic diagram depicting the refrigerant and engine coolant flows during the heating cycle operating at ambient temperatures above a threshold ambient temperature without an optional cold climate auxiliary heater (AXHTR)

FIG. 3A shows the system 50, without any optional devices installed, operating in the heating cycle when the ambient temperature is above a threshold frost point temperature of the outdoor exchangers 11A, 11B. The switching valve 25 directs the hot engine coolant to a frost avoidance valve 28. Since the outdoor ambient temperature is above the threshold frost point temperature, the PID control loop of the control system directs all hot coolant to circuit (C) of the indoor heat exchanger 6.

The indoor heat exchanger 6 includes two interlaced refrigerant circuits (A, B) and an auxiliary heat circuit (C). The auxiliary heat circuit (C) is located on the outlet side of the indoor heat exchanger 6 downstream of the refrigerant circuits with respect to the air flow created by the indoor blower 31. This configuration of the refrigerant and engine coolant circuits provides several primary benefits. First, due to the sizing and arrangement of the outdoor heat exchangers 11A, 11B, heat recovery from the outside air is maximized and transferred to the subject air-conditioned space. Second, due to the interlacing circuits (A, B) within the indoor heat exchanger 6, partial load efficiency is maximized. Third, waste heat recovered from engine 1 is transferred to the subject air-conditioned space and provides significantly higher air temperatures than possible with conventional heat pump systems during low ambient temperature cycle. Moreover, a significant increase in the COP over conventional heat pump systems is achieved.

Figure 3B:
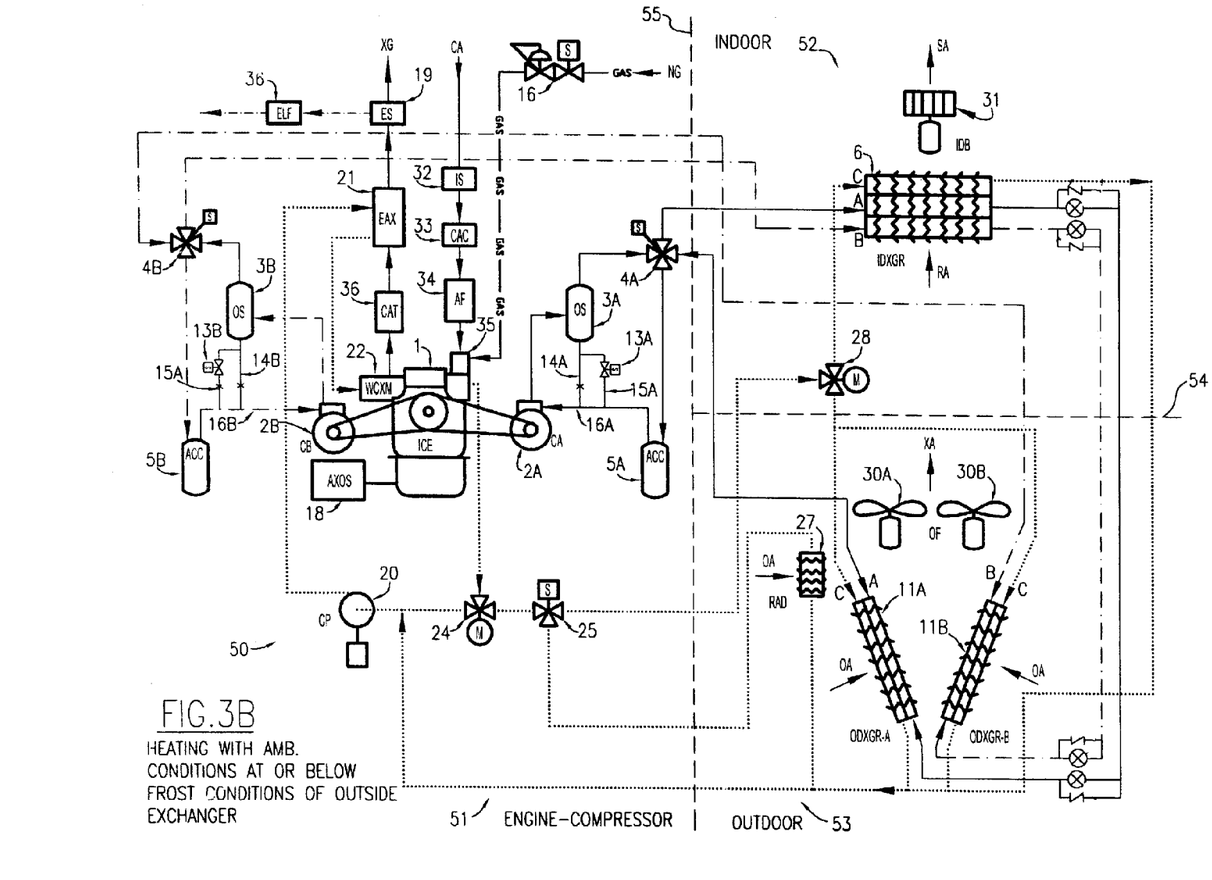
FIG. 3B illustrates a schematic diagram depicting the refrigerant and engine coolant flows during the heating cycle operating at ambient temperatures at or below the threshold frost point ambient temperature without an optional cold climate auxiliary heater (AXHTR)

Now referring to FIG. 3B, the system 50, without optional devices installed, is shown operating in the heating cycle when ambient temperatures are at or below the threshold frost point temperature of the outdoor exchangers 11A, 11B. The switching valve 25 directs the hot engine coolant to the frost avoidance valve 28. Sensors or similar devices located in the outdoor section 53 sense and report when temperatures are such that frost is likely to form on coils of the outdoor exchangers 11A, 11B. As temperatures approach the threshold frost point, the PID control loop adjusts the flow through the frost avoidance valve 28 by directing some or all of the engine heat coolant from the indoor heat exchanger 6 to the frost avoidance circuit (C) in the outdoor heat exchangers 11A, 11B. The frost avoidance circuit (C) is located on an inlet side of the outdoor heat exchangers 11A, 11B wherein the inlet side is upstream with respect to the air flow created by fans 30A, 30B. Cooled engine coolant exits the indoor heat exchanger 6 and the outdoor heat exchangers 11A, 11B and flows back to the coolant pump 20 where the cycle begins again. This configuration offers two primary benefits. First, the outdoor exchangers 11 A, 11B never require defrosting thereby eliminating the high energy used by conventional heat pumps to defrost exchanger pipes. Second, even though the hot engine coolant is directed from its primary function of increasing the heat delivered to the subject air-conditioned space, the energy is not wasted since it is reabsorbed into the system 50 by increasing the temperature of the air entering the refrigerant circuits (A, B) of the outdoor heat exchangers 11 a, 11B which function as evaporators during the heating cycle of cycle. The effect is that the inlet temperature of the outdoor air to the evaporator is increased several degrees, thus raising the overall heating effect of the system 50 and the corresponding COP.

Figure 3C:
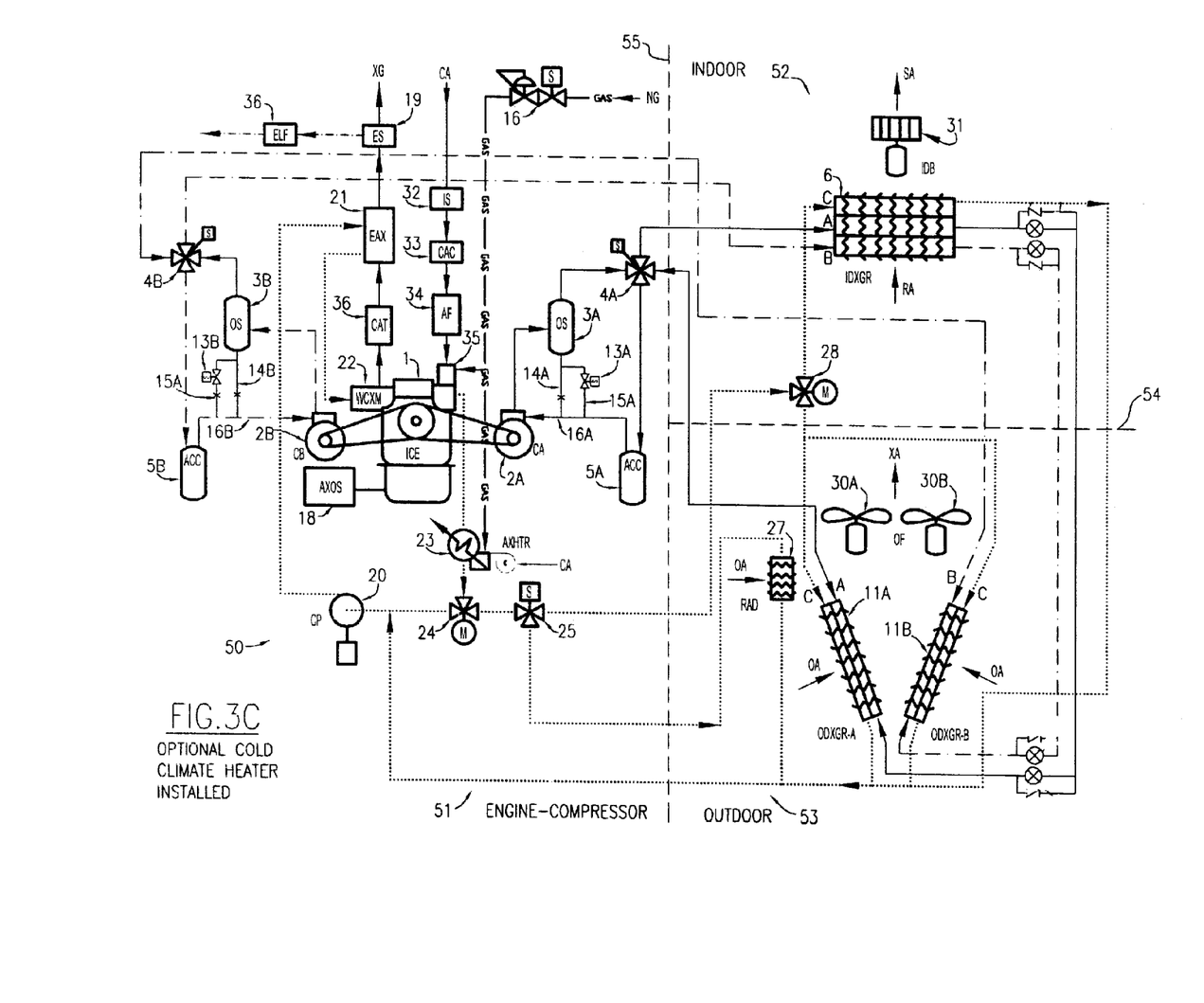
FIG. 3C illustrates a schematic diagram depicting the system with the optional cold climate auxiliary heater (AXTHR) installed.

FIG. 3C shows the system 50 including supplemental heating for system cycle in climates not suitable for conventional heat pump systems. An auxiliary heater 23 is installed between the internal combustion engine 1 and the engine temperature control valve 24. Hot engine coolant exits the internal combustion engine 1 and flows to the auxiliary heater 23 where it is heated to a higher temperature by a natural gas burner using the natural gas (or propane) supplied from the combined safety cutoff device and pressure regulator 16. The engine coolant then flows to the engine temperature control valve 24. The system 50 continues to operate as described above with respect to the heating cycle. However, since the engine coolant now has a higher temperature, it provides additional heat to the subject air-conditioned space. Another advantage of the auxiliary heater 23 is that it facilitates a shorter startup time for the internal combustion engine 1 resulting in the ability to more quickly heat the subject air-conditioned space.

An electrical control system including circuitry, logic and related electronic components, is operable to manage the system 50. A thermostat controllable by a user dictates whether the system 50 is in the cooling or heating cycle and at what temperature level. More particularly, the control system can vary the speed of the engine 1, indoor blower 31 and outdoor fans 30A, 30B and the number of running refrigeration compressors 2A, 2B. The control system includes sensors designed to monitor the system 50 for irregular operational conditions. Based on the detection of irregular or abnormal operational conditions, the control system automatically takes steps to correct the irregularities or abnormalities or shut down the system 50 when the irregularities cannot be corrected. The control system further controls coolant flow during the different cycles. Air-fuel mixture is also managed by the control system.

Although the invention has been described in detail with reference to several embodiments, additional variations and modifications exist within the scope and spirit of the invention as described and defined in the following claims.

We claim:

1. A gas heat pump system having an engine compressor section, indoor section and outdoor section comprising:
    one or more refrigeration circuits comprising a refrigeration compressor and switching device, said switching device operable to direct refrigerant into the indoor section during a heating cycle and into the outdoor section during a cooling cycle;
    said engine compressor section comprising:
        an engine capable of running on a gaseous fuel;
        an engine cooling system;
        a fuel intake system; and
        an exhaust gas system;
    said indoor section comprising:
        an indoor heat exchanger;
        one or more fans operable to pass indoor air across the indoor heat exchanger; and
        one or more expansion valves corresponding to the indoor heat exchanger;
    said outdoor section comprising:
        a radiator;
        one or more outdoor heat exchangers;
        one or more fans operable to pass outdoor air across the radiator and the one or more outdoor heat exchangers;
        one or more expansion valves corresponding to each outdoor heat exchanger; and
    a control system operable to vary engine speed, number of refrigeration compressors running and blower speed in response to a thermostat setting.

2. The gas heat pump system of claim 1 wherein said control system comprises a closed loop feedback system operable to control an air-fuel mixture.

3. The gas heat pump system of claim 1 wherein the cooled exhaust manifold and exhaust air exchanger are operable to exhaust and recover waste heat.

4. The gas heat pump system of claim 1 wherein said expansion valve corresponding to said indoor section is operable to decompress and expand liquid refrigerant during the cooling cycle.

5. The gas heat pump system of claim 1 wherein said expansion valves corresponding to said outdoor section are operable to decompress and expand liquid refrigerant during the heating cycle.

6. The gas heat pump system of claim 1 wherein the indoor heat exchanger is, during the heating cycle, operable to exchange heat between said refrigerant and engine coolant exiting said engine compressor section.

7. The gas heat pump system of claim 1 wherein the outdoor heat exchangers are, during the heating cycle, operable to exchange heat between said refrigerant and engine coolant exiting said engine compressor section.

8. The gas heat pump system of claim 1 wherein each said outdoor heat exchanger comprises a refrigerant section and frost prevention section wherein:
    said refrigerant section comprises multiple circuits, said refrigerant section operable as a condenser during the cooling cycle and as an evaporator during the heating cycle; and
    said frost prevention section comprises a single circuit positioned up-stream of fans passing air across said one or more outdoor heat exchangers, said frost prevention section operable to receive hot engine coolant during the heating cycle during low ambient temperature.

9. The gas heat pump system of claim 1 wherein said indoor heat exchanger comprises a refrigerant section and auxiliary heat section wherein:
said refrigerant section comprises multiple circuits, said refrigerant section operable as a condenser during the cooling cycle and as an evaporator during the heating cycle;
said refrigerant section comprises interlaced refrigerant circuits; and
said auxiliary heat section comprises a single circuit positioned on a downstream side of the indoor exchanger apparatus in a flow direction of indoor air introduced by said indoor blower in said indoor heat exchanger apparatus, said auxiliary heat section utilizing hot engine coolant for providing heat.

10. The gas heat pump system of claim 1 wherein said engine-compressor section comprises an auxiliary heater operable to provide additional heat during low ambient temperature conditions wherein:
said auxiliary heater comprises a gas or propane burner device, a combustion air blower and a heat exchanger device, said auxiliary heater operable to heat engine coolant prior to the engine coolant flowing to a engine temperature control device.

11. The gas heat pump system of claim 1 wherein said engine cooling system further comprises a coolant circulating pump, engine temperature control device and engine coolant switching valve.

12. The gas heat pump system of claim 1 wherein said exhaust gas system further comprises an exhaust separator device and exhaust liquid filter device.

13. The gas heat pump system of claim 1 wherein the engine runs on natural gas or propane.

14. The gas heat pump system of claim 1 further comprising an engine heat recovery system in the engine compressor section.

15. The gas heat pump system of claim 1 further comprising a frost avoidance valve in the indoor section.

16. The gas heat pump system of claim 1 further comprising a control system.

17. The gas heat pump system of claim 1 wherein said control system is operable to determine abnormal operating conditions of the gas heat pump system and automatically remedy the abnormality or shut down the gas heat pump system.

18. A gas heat pump, system having an engine compressor section, indoor section and outdoor section comprising:
one or more refrigeration circuits comprising a refrigeration compressor and switching device, said switching device operable to direct refrigerant into the indoor section during a heating cycle and into the outdoor section during a cooling cycle;
said engine compressor section comprising:
an engine capable of running on a gaseous fuel;
an engine cooling system;
a fuel intake system; and
an exhaust gas system;
said indoor section comprising:
an indoor heat exchanger;
one or more fans operable to pass indoor air across the indoor heat exchanger; and
one or more expansion valves corresponding to the indoor heat exchanger;
said outdoor section comprising:
a radiator;
one or more outdoor heat exchangers;
one or more fans operable to pass outdoor air across the radiator and the one or more outdoor heat exchangers;
one or more expansion valves corresponding to each outdoor heat exchanger; and
wherein said indoor section further comprises a combustion air cooling apparatus including an air blower operable to introduce air to cool combustion air wherein:
said combustion air cooling apparatus is positioned in series with an inlet silencer and a combustion air filter.

19. A gas heat pump system having an engine compressor section, indoor section and outdoor section comprising:
one or more refrigeration circuits comprising a refrigeration compressor and switching device, said switching device operable to direct refrigerant into the indoor section during a heating cycle and into the outdoor section during a cooling cycle;
said engine compressor section comprising:
an engine capable of running on a gaseous fuel;
an engine cooling system;
a fuel intake system; and
an exhaust gas system;
said indoor section comprising:
an indoor heat exchanger;
one or more fans operable to pass indoor air across the indoor heat exchanger; and
one or more expansion valves corresponding to the indoor heat exchanger;
said outdoor section comprising:
a radiator;
one or more outdoor heat exchangers;
one or more fans operable to pass outdoor air across the radiator and the one or more outdoor heat exchangers;
one or more expansion valves corresponding to each outdoor heat exchanger; and
wherein said engine-compressor section further comprises a hot water exchanger apparatus and a control valve device wherein:
said hot water heat exchanger apparatus is operable to exchange water heat from said engine coolant to a domestic water source during a cooling cycle; and
said control valve is operable to regulate an amount of heat transferred to said domestic water source by diverting a portion of said hot engine coolant.

20. A gas heat pump system having an engine compressor section, indoor section and outdoor section comprising:
a control system;
a pair of refrigeration circuits comprising a refrigeration compressor, oil separator device, switching device, compressor suction accumulator device and multiple compressor oil metering devices, said switching device operable to direct refrigerant into the indoor section during a heating cycle and into the outdoor section during a cooling cycle;
said engine compressor section comprising:
an engine capable of running on a gaseous fuel;
an engine cooling system comprising a coolant circulating pump, engine temperature control device and an engine coolant switching valve;
an engine waste heat recovery system including an exhaust air exchanger and cooled exhaust manifold;
a fuel intake system; and
an exhaust gas system comprising an exhaust separator device and exhaust liquid filter device;
said indoor section comprising:
an indoor heat exchanger;

one or more fans operable to pass indoor air across the indoor heat exchanger;

an expansion valve corresponding to the indoor heat exchanger; and a frost avoidance valve;

said outdoor section comprising:

a radiator a pair of outdoor heat exchangers;

one or more fans operable to pass outdoor air across the radiator and the outdoor heat exchangers;

an expansion valve corresponding to each outdoor heat exchanger; and a control system operable to vary engine speed, number of refrigeration compressors running and blower speed in response to a thermostat setting.

21. The gas heat pump system of claim 20 wherein said control system comprises a closed loop feedback system operable to control an air-fuel mixture.

22. The gas heat pump system of claim 20 wherein the cooled exhaust manifold and exhaust air exchanger are operable to exhaust and recover waste heat.

23. The gas heat pump system of claim 20 wherein said expansion valve corresponding to said indoor section is operable to decompress and expand liquid refrigerant during the cooling cycle.

24. The gas heat pump system of claim 20 wherein said expansion valves corresponding to said outdoor section are operable to decompress and expand liquid refrigerant during the heating cycle.

25. The gas heat pump system of claim 20 wherein the indoor heat exchanger is, during the heating cycle, operable to exchange heat between said refrigerant and engine coolant exiting said engine compressor section.

26. The gas heat pump system of claim 20 wherein the outdoor heat exchangers are, during the heating cycle, operable to exchange heat between said refrigerant and engine coolant exiting said engine compressor section.

27. The gas heat pump system of claim 20 wherein each said outdoor heat exchanger comprises a refrigerant section and frost prevention section wherein:

said refrigerant section comprises multiple circuits, said refrigerant section operable as a condenser during the cooling cycle and as an evaporator during the heating cycle; and said frost prevention section comprises a single circuit positioned up-stream of fans passing air across said outdoor heat exchangers, said frost prevention section operable to receive hot engine coolant during the heating cycle during low ambient temperature.

28. The gas heat pump system of claim 20 wherein said indoor heat exchanger comprises a refrigerant section and auxiliary heat section wherein:

said refrigerant section comprises multiple circuits, said refrigerant section operable as a condenser during the cooling cycle and as an evaporator during the heating cycle;

said refrigerant section comprises interlaced refrigerant circuits; and said auxiliary heat section comprises a single circuit positioned on a downstream side of the indoor exchanger apparatus in a flow direction of indoor air introduced by said indoor blower in said indoor heat exchanger apparatus, said auxiliary heat section utilizing hot engine coolant for providing heat.

29. The gas heat pump system of claim 20 wherein said engine-compressor section comprises an auxiliary heater operable to provide additional heat during low ambient temperature conditions wherein:

said auxiliary heater comprises a gas or propane burner device, a combustion air blower and a heat exchanger device, said auxiliary heater operable to heat engine coolant prior to the engine coolant flowing to said engine temperature control device.

30. The gas heat pump system of claim 20 wherein said control system is operable to determine abnormal operational conditions of the gas heat pump system and automatically remedy the abnormality or shut down the gas heat pump system.

31. A gas heat pump system having an engine compressor section, indoor section and outdoor section comprising:

a control system;

a pair of refrigeration circuits comprising a refrigeration compressor, oil separator device, switching device, compressor suction accumulator device and multiple compressor oil metering devices, said switching device operable to direct refrigerant into the indoor section during a heating cycle and into the outdoor section during a cooling cycle;

said engine compressor section comprising:

an engine capable of running on a gaseous fuel;

an engine cooling system comprising a coolant circulating pump, engine temperature control device and an engine coolant switching valve;

an engine waste heat recovery system including an exhaust air exchanger and cooled exhaust manifold;

a fuel intake system; and an exhaust gas system comprising an exhaust separator device and exhaust liquid filter device;

said indoor section comprising:

an indoor heat exchanger;

one or more fans operable to pass indoor air across the indoor heat exchanger;

an expansion valve corresponding to the indoor heat exchanger; and a frost avoidance valve;

said outdoor section comprising:

a radiator;

a pair of outdoor heat exchangers;

one or more fans operable to pass outdoor air across the radiator and the outdoor heat exchangers;

an expansion valve corresponding to each outdoor heat exchanger; and wherein said indoor section further comprises a combustion air cooling apparatus includes an air blower operable to introduce air to cool combustion air wherein:

said combustion air cooling apparatus is positioned in series with an inlet silencer and a combustion air filter.

32. A gas heat pump system having an engine compressor section, indoor section and outdoor section comprising:

a control system:

a pair of refrigeration circuits comprising a refrigeration compressor, oil separator device, switching device, compressor suction accumulator device and multiple compressor oil metering devices, said switching device operable to direct refrigerant into the indoor section during a heating cycle and into the outdoor section during a cooling cycle;

said engine compressor section comprising:

an engine capable of running on a gaseous fuel;

an engine cooling system comprising a coolant circulating pump, engine temperature control device and an engine coolant switching valve;

an engine waste heat recovery system including an exhaust air exchanger and cooled exhaust manifold;

a fuel intake system; and an exhaust gas system comprising an exhaust separator device and exhaust liquid filter device;

said indoor section comprising:

an indoor heat exchanger;

one or more fans operable to pass indoor air across the indoor heat exchanger;

an expansion valve corresponding to the indoor heat exchanger; and a frost avoidance valve;

said outdoor section comprising:

a radiator;

a pair of outdoor heat exchangers;

one or more fans operable to pass outdoor air across the radiator and the outdoor heat exchangers;

an expansion valve corresponding to each outdoor heat exchanger; and wherein said engine-compressor section further comprises a hot water exchanger apparatus and a control valve device wherein:

said hot water heat exchanger apparatus is operable to exchange water heat from said engine coolant to a domestic water source during a cooling cycle; and said control valve is operable to regulate an amount of heat transferred to said domestic water source by diverting a portion of said hot engine coolant.

33. The gas heat pump system of claim 20 wherein the engine runs on natural gas or propane.

* * * * *